UNITED STATES PATENT OFFICE.

STEPHEN KRACKOWIZER, OF HOBOKEN, NEW JERSEY.

IMPROVEMENT IN PROCESSES FOR TREATING TOBACCO EXTRACTS.

Specification forming part of Letters Patent No. 182,682, dated September 26, 1876; application filed June 27, 1876.

*To all whom it may concern:*

Be it known that I, STEPHEN KRACKOWIZER, of Hoboken, New Jersey, have invented a certain Improvement in the Preparation of Extracts from Tobacco-Stems, of which the following is a specification:

My present invention relates to certain improvements upon the process of preparing extracts from tobacco-stems described in my patent for the same, No. 179,323, June 27, 1876.

My improved process consists, first, in subjecting tobacco-stems, contained in a suitable vessel, to the direct action of live steam for a sufficient length of time to expel from the stems the noxious nicotine which they contain. As nicotine is volatile it is easily driven off in the form of vapor. Secondly, after the nicotine has been expelled, I increase the steam-pressure sufficiently to extract the less volatile nicotianine, a certain percentage of which is held in solution in the liquor of distillation, while the remainder, in the form of an oily fluid, rises to the top of the liquor of distillation, and is skimmed therefrom; thirdly, after skimming off the oil, I treat the remaining liquor of distillation with an acid, preferably nitric acid, for the purpose of rendering the nicotianine held in solution non-volatile; fourthly, I return the liquor of distillation, thus acidulated, to the vessel containing the tobacco-stems, and add thereto a quantity of water, either pure or mixed with alcohol. If alcohol is used with the water, some portion of the resinous substances in the tobacco-stems will be dissolved, thus forming a partially alcoholic extract. If no alcohol is used, the extract will be simply aqueous. Fifthly, I boil the stems in the liquor which I have thus added to them, until I have exhausted all the extractive substances from the stems; sixthly, I then draw off the liquor from the stems into an evaporating-pan, and boil it down to the consistency of an extract.

As nicotianine is volatile, that portion of nicotianine held in solution by the liquor of distillation would be driven off in the process of concentration, unless fixed or rendered non-volatile by the treatment of the liquor of distillation with an acid. For this purpose nitric acid is preferable, and this treatment of the skimmed liquor of distillation with an acid, prior to its return to the tobacco-stems, and subsequent concentration, constitutes the distinguishing feature of my present improvement.

In my former application I described my process as consisting of the treatment with live steam of tobacco-stems in a partly fermented state.

I find that it is not necessary to allow any fermentation of the tobacco-stems, and that the process may be successfully conducted, as herein described, without allowing time for the moist tobacco-stems to ferment.

Having obtained my extract of tobacco-stems, as has been described, I then add to it a suitable quantity of the nicotianine obtained by distillation in the earlier stage of the process, as has been described.

By using the stems of the finer kinds of tobacco, as for example, the Havana brands, I am thus enabled to obtain an extract, composed of the soluble extractive substances contained in the Havana tobacco, which extract can be used with great advantage to impregnate the inferior brands of tobacco, and thus impart to the inferior brands the qualities and flavor of the superior brands.

What I claim as my invention is—

1. The herein-described process of preparing extracts from tobacco-stems, which consists in first expelling from the tobacco-stems the noxious nicotine; then in expelling a portion of the nicotianine by distillation; then in skimming the nicotianine from the liquor of distillation, and treating the remaining liquor of distillation with an acid; then in returning the liquor of distillation to the tobacco-stems; then in adding water, or water mixed with alcohol; then in boiling the stems until they have given up the extractive substances which they contain; then in drawing off the liquor from the stems, and evaporating it to the consistency of an extract; and then, finally, in adding to the concentrated extract a suitable quantity of the nicotianine obtained by skimming the liquor of distillation.

2. In preparing tobacco-extracts by distillation, I claim treating the liquor of distillation with an acid, for the purpose of forming a salt of nicotianine, and thus preventing the escape of the nicotianine from the liquor of distillation by volatilization.

STPH. KRACKOWIZER.

Witnesses:
 M. L. ADAMS,
 GEO. W. MIATT.